Nov. 8, 1966   J. NANIGIAN ETAL   3,283,580
FAST RESPONSE RIGHT ANGLE THERMOCOUPLE
Filed Sept. 24, 1963   2 Sheets-Sheet 1

INVENTORS
JACOB NANIGIAN
EDWARD J. NICHOLS
BY
AGENT

Nov. 8, 1966     J. NANIGIAN ETAL     3,283,580
FAST RESPONSE RIGHT ANGLE THERMOCOUPLE
Filed Sept. 24, 1963     2 Sheets-Sheet 2

INVENTORS
JACOB NANIGIAN
EDWARD J. NICHOLS
BY *William R. Wright*
AGENT

United States Patent Office 3,283,580
Patented Nov. 8, 1966

3,283,580
FAST RESPONSE RIGHT ANGLE THERMOCOUPLE
Jacob Nanigian and Edward J. Nichols, Indian Head, Md., assignors to Nanmac Corporation, Needham Heights, Mass.
Filed Sept. 24, 1963, Ser. No. 316,482
2 Claims. (Cl. 73—359)

This invention relates to thermocouples and particularly to an improved construction which minimizes breakage due to high pressures, shocks, and mechanical stresses, and provides a fast response with a minimum of conduction errors.

An important object of the present invention is to provide an improved thermocouple in which the thermal elements at the probe end consist of ribbons electrically welded together at the sensing tip and bowed out therefrom so as to have a cushioning action when subjected to high pressure, shocks and mechanical stresses.

Another important object of the present invention is to provide an improved thermocouple in which the ribbon elements are brought out from opposing sides of the probe along the interface of a high temperature rod and hollow tube or cone insulation insert assembly and the ribbons, in the vicinity of the thermal junction, are parallel to the plane of heat source so that both the ribbons and their thermal junction are heated simultaneously and conduction errors are minimized.

A further important object of the present invention is to provide an improved thermocouple of the type described which is simple and practical in construction, susceptible of ready and economical manufacture and assembly, and which will be rugged and of long life in use.

Other objects and advantages of the invention will become apparent during the course of the following description.

In the drawings we have shown one embodiment of the invention. In this showing:

Figure 1:
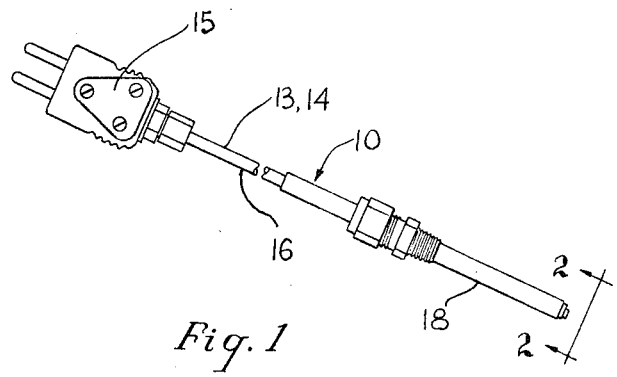
FIGURE 1 is a perspective view of the improved thermocouple comprising the present invention and its connector.
Figure 2:
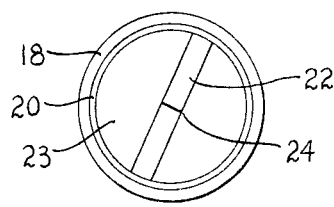
FIGURE 2 is an end elevational view thereof to an enlarged scale.

Referring to the drawings, numeral 10 designates the thermocouple as a whole which includes lead wires 13, 14 from a conventional connector 15 which enter a tubular metal sheath 16 containing compressed insulation 17 which mechanically holds the lead wires upon swaging of the sheath as is conventional. The end of the swaged tubular sheath 16 extends within and is secured to a stainless steel tube or housing 18 by welding or the like as at 19.

Figure 3:
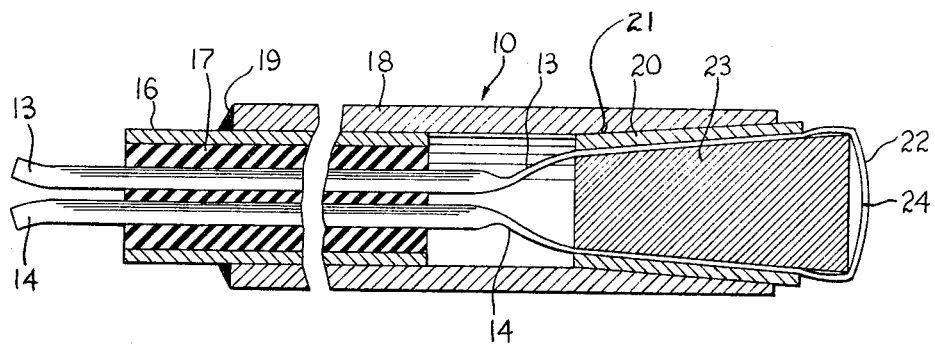
FIGURE 3 is a central, longitudinal sectional view of the thermocouple.

The right end of the tube 18 is internally tapered to receive a pair of identically tapered lava (or other type high temperature insulation) inserts 20, 23 which, being tubular and solid circular (or hollow and solid dowels) respectively, interfit mechanically with one another and the tube 18 and form the probe end of the thermocouple. As is clearly shown in FIGURE 3, the lead wires 13, 14 project out of the insulation 17 and are flattened into ribbons so as to extend between and along the interface of the two lava inserts 20, 23 and are bent substantially at right angles to the axis of the tube 18 around the end face of the insert 23 toward each other as at 22 and overlap. The overlap of these flat ribbons is spot welded to form a thermal junction 24 and the excess ribbon is removed.

An important feature of the invention resides in the slight outwardly-of-the-end curve of the flat ribbon portions 22 which thus form a bow at the center of which is their hot thermal junction 24. This bowed, welded ribbon thermal junction comprises an extremely flexible tip for the thermocouple and minimizes breakage due to high pressures, shocks, and mechanical stresses. The action of the thermal junction 24 is that of a leaf spring device and pressure and mechanical shocks cause it to deflect and absorb the shocks. Exceptionally high pressures or violent mechanical stresses push the ribbons back against the blunt end of the lava insert 23 which acts as a backstop.

The lava inserts are readily assembled with the thermocouple ribbons between them and diametrically opposite portions of the outer surface of the inner insert 23 may be flattened to accommodate the ribbons upon which it is inserted in the outer tubular insert 20 which is mechanically forced into the tapered end 21 of the tube 18 to mechanically support the thin wire ribbons of the lead wires 13, 14. The lava inserts 20, 23 may be any desired type of electrical insulation, the tube 18 may be of any configuration and of any suitable material, and the lead wires 13, 14 and thermocouple ribbons may be any conventional or non-convention pair.

Figure 4:
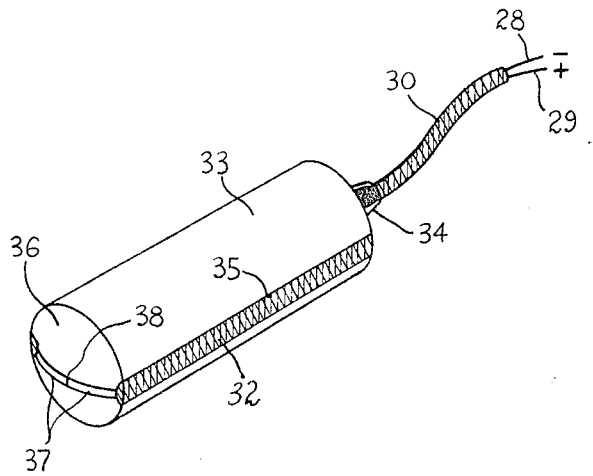
FIGURE 4 is a perspective view to a reduced scale of an optional manner of mounting the lead wires and ribbons on the solid dowel core insert.

A variation in the assembly of the inner insert and lead wires and ribbons is shown in FIGURE 4 wherein #36 gauge Chromel-Alumel lead wires 28, 29 are provided with and encased in fiberglass insulation 30 and connected to a non-tapered inner, high temperature insulation insert 33 by high temperature cement as at 34. The solid rod insert 33 is provided with diametrically oppositely positioned, milled slots 35 into which the lead wires 28, 29 are placed and retained as by potting as indicated by numeral 32. At the sensing tip end 36 of the insert 33, the lead wires are bared and flattened into ribbons 37 which, as before are bent approximately 90° toward each other into a bow and overlap and are spot welded at 38 to form a hot thermal junction.

The ribbons 37 are also parallel to the plane of the heat source and allow fast time to equilibrium temperatures since a maximum surface contact area is offered to the heat source.

Figure 5:
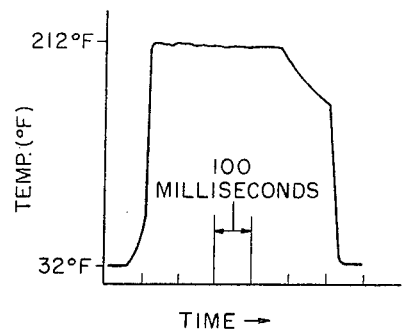
FIGURE 5 is a graph showing the fast response of the thermocouple comprising the present invention.

The graph of FIGURE 5 is a reproduction of temperature versus time data obtained by manually immersing the right angle thermocouple 10 in ice water, in boiling water, and then in ice water again. It is to be noted that the time: to 50% of $\Delta T$ is 14 milliseconds; to 63.2% of $\Delta T$ is 18 milliseconds; and to 95% of $\Delta T$ is 26 milliseconds.

The thermocouple probe materials may be metal, plastic, or ceramic, the mountings may be adjustable compression fittings or fixed mountings, and the thermocouple, which may be used with all standard thermocouple combinations and connectors available, will withstand pressure ranges to 10,000 p.s.i. and temperature ranges to 3200° F.

It is to be understood that the forms of our invention herewith shown and described are to be taken as preferred examples of the same and that various changes in the shape, size, and arrangement of parts may be resorted to without departure from the spirit of the invention or the scope of the subjoined claims.

We claim:

1. A thermocouple for measuring the temperature within an enclosure comprising, in combination, a cylindrical tube, a tubular sheath fixedly mounted in one end of said tube, a pair of unitary wires extending into said sheath and out of the other end of said tube, separate electrically insulating material mounted in said sheath and in said other tube end and holding said wires in non-conducting relation with respect to each other and to said sheath and said other tube end, the ends of said wires extending out of said other tube end being flattened into integral ribbons and bent toward each other at substantially right angles to the longitudinal axis of said tube and welded to form a bowed thermal junction spaced from the end face of said insulating material in said other tube end, said ribbons forming said junction being bowed so as to flex toward said end face to absorb shock and for ultimate support thereby under high pressures and mechanical stresses.

2. The combination recited in claim 1 wherein the diametrically opposite sides of said insulating means in said other end of said tube are milled to provide longitudinally extending slots for said wires, and said wires are potted in said slots.

References Cited by the Examiner
UNITED STATES PATENTS

| | | | |
|---|---|---|---|
| 1,241,496 | 10/1917 | Chubb | 73—359 X |
| 1,942,516 | 1/1934 | Noyes | 73—359 X |
| 2,142,677 | 1/1939 | Parker | 73—359 X |
| 2,279,846 | 4/1942 | Stapleton | 73—359 X |

LOUIS R. PRINCE, *Primary Examiner.*

D. M. YASICH, *Assistant Examiner.*